US009616919B2

(12) United States Patent
Arbjerg et al.

(10) Patent No.: US 9,616,919 B2
(45) Date of Patent: Apr. 11, 2017

(54) HYDRAULIC STEERING DEVICE

(71) Applicant: Danfoss Power Solutions APS, Nordborg (DK)

(72) Inventors: Niels Arbjerg, Sydals (DK); Rene Andersen, Soenderborg (DK)

(73) Assignee: Danfoss Power Solutions APS, Nordborg (DK)

( * ) Notice: Subject to any disclaimer, the term of this patent is extended or adjusted under 35 U.S.C. 154(b) by 362 days.

(21) Appl. No.: 14/368,309

(22) PCT Filed: Dec. 10, 2012

(86) PCT No.: PCT/EP2012/005119
§ 371 (c)(1),
(2) Date: Jun. 24, 2014

(87) PCT Pub. No.: WO2013/097925
PCT Pub. Date: Jul. 4, 2013

(65) Prior Publication Data
US 2014/0374187 A1 Dec. 25, 2014

(30) Foreign Application Priority Data
Dec. 28, 2011 (EP) .................................... 11010248

(51) Int. Cl.
*B62D 5/06* (2006.01)
*B62D 5/065* (2006.01)
(Continued)

(52) U.S. Cl.
CPC ............. *B62D 5/065* (2013.01); *B62D 5/093* (2013.01); *B62D 5/30* (2013.01)

(58) Field of Classification Search
CPC .................................. B62D 5/06; B62D 5/083
(Continued)

(56) References Cited

U.S. PATENT DOCUMENTS 4,595,071 A * 6/1986 Mehren .................. B62D 5/06
180/422
4,621,704 A * 11/1986 Kozuka .................. B62D 5/06
180/423
(Continued)

FOREIGN PATENT DOCUMENTS

CN     1034512 A      8/1989
CN     1201924 A      12/1998
(Continued)

OTHER PUBLICATIONS

International Search Report for PCT Serial No. PCT/EP2012/005119 dated Feb. 18, 2013.
(Continued)

*Primary Examiner* — Joseph Rocca
*Assistant Examiner* — Conan Duda
(74) *Attorney, Agent, or Firm* — McCormick, Paulding & Huber LLP

(57) ABSTRACT

A hydraulic steering device is provided comprising a supply port arrangement having a pressure port (P) and a tank port (5), a working port arrangement having two working ports (L, R), a main flow path (14) between the pressure port (P) and the working port arrangement, a return flow path (16) between the working port arrangement and the tank port (5), flow meter means (15) being arranged in said main flow path (14), an amplification flow path (17) being arranged in parallel to said main flow path (14), said amplification flow path (17) being connected to said main flow path (14) downstream said flow meter means (15) in a direction from said pressure port (P) to said working port arrangement. A risk of dangerous situations in case of jamming of the flow meter should be reduced. To this end pressure increasing means are provided increasing a pressure over said flow
(Continued)

meter means (15) in case a flow through said main flow path (14) is blocked by said flow meter (15).

10 Claims, 2 Drawing Sheets

(51) Int. Cl.
  *B62D 5/093* (2006.01)
  *B62D 5/30* (2006.01)
(58) Field of Classification Search
  USPC .................. 180/441, 442; 60/384, 385, 386
  See application file for complete search history.

(56) References Cited

U.S. PATENT DOCUMENTS

| | | | |
|---|---|---|---|
| 4,644,846 A * | 2/1987 | Kozuka | B62D 5/08 91/31 |
| 4,715,464 A * | 12/1987 | Nakamura | B62D 6/00 180/423 |
| 5,515,938 A * | 5/1996 | Haga | B62D 5/083 180/417 |
| 5,620,026 A | 4/1997 | Stephenson et al. | |
| 5,638,912 A * | 6/1997 | Haga | B62D 5/083 180/417 |
| 5,651,423 A * | 7/1997 | Haga | B62D 6/02 180/403 |
| 5,806,561 A | 9/1998 | Pedersen et al. | |
| 5,819,532 A | 10/1998 | Wang et al. | |
| 5,836,418 A * | 11/1998 | Kim | B62D 6/00 180/421 |
| 5,878,780 A * | 3/1999 | Thomas | B62D 5/083 137/625.23 |
| 5,960,694 A * | 10/1999 | Thomas | B62D 5/09 180/412 |
| 6,544,018 B2 | 4/2003 | Heckel et al. | |
| 2001/0004032 A1 * | 6/2001 | Zenker | B62D 5/30 180/442 |
| 2002/0170769 A1 * | 11/2002 | Sakaki | B62D 5/065 180/441 |
| 2008/0010982 A1 * | 1/2008 | Ulbricht | B62D 5/062 60/384 |
| 2008/0116001 A1 | 5/2008 | Graeve et al. | |
| 2008/0202842 A1 * | 8/2008 | Shevket | B60K 7/0015 180/442 |
| 2009/0199915 A1 | 8/2009 | Novacek et al. | |
| 2010/0258375 A1 * | 10/2010 | Miller | B62D 5/065 180/441 |
| 2014/0298792 A1 | 10/2014 | Andersen et al. | |
| 2014/0374187 A1 | 12/2014 | Arbjerg et al. | |
| 2015/0158522 A1 | 6/2015 | Thayer | |

FOREIGN PATENT DOCUMENTS

| | | |
|---|---|---|
| CN | 1206382 A | 1/1999 |
| CN | 1323709 A | 11/2001 |
| CN | 201297306 Y | 8/2009 |
| CN | 201484482 U | 5/2010 |
| CN | 101952159 A | 1/2011 |
| DE | 2228531 C2 | 7/1982 |
| DE | 19511501 A1 | 10/1996 |
| DE | 10257130 A1 | 7/2004 |
| DE | 10252215 B3 | 10/2004 |
| DE | 102005035171 A1 | 2/2007 |
| EP | 0096963 A2 | 12/1983 |
| EP | 1212231 B1 | 6/2002 |

OTHER PUBLICATIONS

International Search Report for PCT Application No. PCT/EP2012/005120 dated May 8, 2013.
International Search Report for PCT Application No. PCT/EP2012005121 dated Feb. 28, 2013.
European Search Report for European Application No. EP11010247 dated Jul. 9, 2012.
European Search Report for European Application No. EP11010248 dated Jul. 9, 2012.
European Search Report for European Application No. EP11010236 dated Jul. 9, 2012.

* cited by examiner

HYDRAULIC STEERING DEVICE

CROSS REFERENCE TO RELATED APPLICATIONS

This application is entitled to the benefit of and incorporates by reference subject matter disclosed in International Patent Application No. PCT/EP2012/005119 filed on Dec. 10, 2012 and European Patent Application 11010248.0 filed Dec. 28, 2011.

FIELD OF THE INVENTION

The present invention relates to a hydraulic steering device comprising a supply port arrangement having a pressure port and a tank port, a working port arrangement having two working ports, a main flow path between the pressure port and the working port arrangement, a return flow path between the working port arrangement and the tank port, flow meter means being arranged in said main flow path, an amplification flow path being arranged in parallel to said main flow path, said amplification flow path being connected to said main flow path downstream said flow meter means in a direction from said pressure port to said working port arrangement.

BACKGROUND

Such a hydraulic steering device is known from U.S. Pat. No. 5,819,532.

Such a hydraulic steering device having an amplification flow path has advantages in that not the whole flow which is supplied to the steering motor over the working port arrangement, has to pass the fluid meter means. Therefore, the fluid meter means can be kept smaller which makes it easier to use this flow meter means as an auxiliary pump in an emergency case. The flow through the main flow path which is metered by the flow meter means and the flow through the amplification flow path have a fixed relation to each other. When they are equal, i.e. the ratio is 1:1, the volume flow through the main flow path is doubled. When the volume flow through the amplification flow path is double the volume flow through the main flow path, the total volume flow is tripled.

The hydraulic steering device of the kind mentioned above has in many cases a spool and a sleeve which are rotatable relative to each other and are arranged in a bore of a housing. When an operator turns a steering wheel the sleeve is rotated relative with respect to the spool (or the other way round). This rotation opens some orifices and closes some other orifices. The open orifices allow hydraulic fluid to pass through the main flow path and through the amplification flow path. The hydraulic fluid flowing through the main flow path flows through the flow meter means. When the flow meter means is driven by the hydraulic fluid it turns back the sleeve relative to the spool into a neutral position so that the orifices in the main flow path and in the amplification flow path close again.

In some cases the flow meter means can be blocked or jammed because of dirt. The hydraulic fluid flowing through the main flow path can no longer flow freely through the main flow path. The flow of hydraulic fluid through the main flow path is stopped although the orifices in the main flow path are open. However, the amplification flow path still allows hydraulic fluid to pass from the pressure port to the working port arrangement thereby actuating the steering motor connected to the working port arrangement. Since the flow meter means is not driven by the hydraulic fluid through the main flow path there is no action to close the orifice or orifices in the amplification flow path. This leads to the risk of a dangerous situation since the steering motor is actuated in an uncontrolled way.

SUMMARY

The task underlying the invention is to reduce the risk of dangerous situations in case of jamming of the flow meter means.

This task is solved with a hydraulic steering device as mentioned above, in that pressure increasing means are provided increasing a pressure over said flow meter means in case that the flow through said main flow path is blocked by said flow meter means.

When the flow meter means is jammed or blocked by dirt or abraded particles within the system the hydraulic fluid cannot longer flow through the main flow path. It bypasses the main flow path via the amplification flow path. According to the invention means are provided increasing the pressure in the main flow path over the flow meter means. This pressure can be increased up to the pressure at the pressure port. Usually, i.e. in a fault free operation, the pressure over the flow meter means is in the range of a few bar. The pressure increasing means are able to increase the pressure over the flow meter means to a range of a few hundred bar, e.g. 200 bar. Such a pressure is able to actuate the flow meter means against the blocking by dirt or abraded particles and to remove these particles from the flow meter means. Therefore, when the pressure has been increased the blocking or jamming of the flow meter means is removed and the flow meter means can act on the remainder of the steering device in order to close the orifices not only in the main flow path but also in the amplification flow path.

In a preferred embodiment said pressure increasing means comprise a valve, said valve being arranged in said amplification flow path and interrupting a flow through said amplification flow path. This is a rather simple possibility to increase the pressure over the flow meter means. When the hydraulic fluid under pressure cannot flow through the main flow path and it is also blocked from flowing through the amplification flow path there are no pressure drops caused by the flowing fluid. In this case the pressure in the main flow path increases up to the pressure at the pressure port. This pressure is usually sufficient to remove the jamming or blocking of the flow meter means.

Preferably said valve is actuated by a pressure in said main flow path upstream said flow meter means. When the flow meter means is jammed by dirt or the like the pressure upstream the flow meter means increases. This pressure increase can be used to actuate the valve in the amplification flow path. Upon jamming of the flow meter means the valve in the amplification flow path is automatically closed. In this case the pressure in the main flow path can increase further. However, this is not a problem since the increased pressure keeps the valve in the amplification flow path closed.

Preferably said valve is actuated by a pressure downstream a main orifice. The main orifice is an orifice arranged in the main flow path. The main orifice is the orifice having the most relevant restriction. This main orifice usually is called the A1 orifice. Other orifices in the main flow path can be orifices placed upstream and downstream the flow meter means which are often called A2 and A3 orifices. Further orifices in the system are situated near the working ports and are called A4 and A5 orifices. When the pressure downstream of the main orifice is used there is no risk that the valve in the amplification flow path is closed when it is not wanted. The main orifice causes a pressure drop so that the closing pressure for the valve in the amplification flow path can be kept small in a fault free situation, i.e. when the flow meter means operates without problems.

Preferably said valve is actuated in a closing direction by the pressure upstream said flow meter means and the force of spring means and is actuated in opening direction by a pressure upstream said valve. The valve is actuated in opening direction by the pressure in the amplification flow path so that it is automatically open again when the jamming of the flow meter means is terminated.

In this case it is preferable that said spring means generate a force corresponding to a pressure drop over said flow meter means and flow meter means orifices, if any, in said flow path. The valve in the amplification flow path is well balanced.

In another preferred embodiment said valve is actuated by a flow through said amplification flow path. The technical effect is almost the same. When the main flow path is blocked because the flow meter means is jammed the volume flow through the amplification flow path increases since the pressure in the amplification flow path increases. This effect can be used to close the valve as well.

Preferably said valve is a check valve via an opening direction by an opening spring means. When the flow of the hydraulic fluid flowing through the amplification flow path increases, a valve element, for example a ball, is moved against the force of the opening spring means and comes to a rest at a valve seat blocking a passage through the amplification flow path.

In a preferred embodiment said check valve is a double acting check valve preventing a back flow from said working port arrangement to said pressure port. In an undisturbed or normal operation the valve element of this double acting check valve is lifted from a first valve seat allowing hydraulic fluid to flow from the pressure port via the amplification flow path to the working port arrangement. However, in this situation the valve element is kept away from the second valve seat by said opening spring means. When the pressure or the speed of the flow increase the valve element is pressed against the second valve seat against the force of the opening spring means thereby blocking the flow through the amplification flow path. When the steering device is operated in an emergency mode and the flow meter means is used as auxiliary pump the check valve is used to block or interrupt a flow from the output of the auxiliary pump or flow meter means back through the amplification flow path to the pressure port. When these two effects are combined in a single valve there is no need for an additional valve.

BRIEF DESCRIPTION OF THE DRAWINGS

Preferred embodiments of the invention will now be described in more detail with reference to the drawing, wherein.

DETAILED DESCRIPTION

Figure 1:
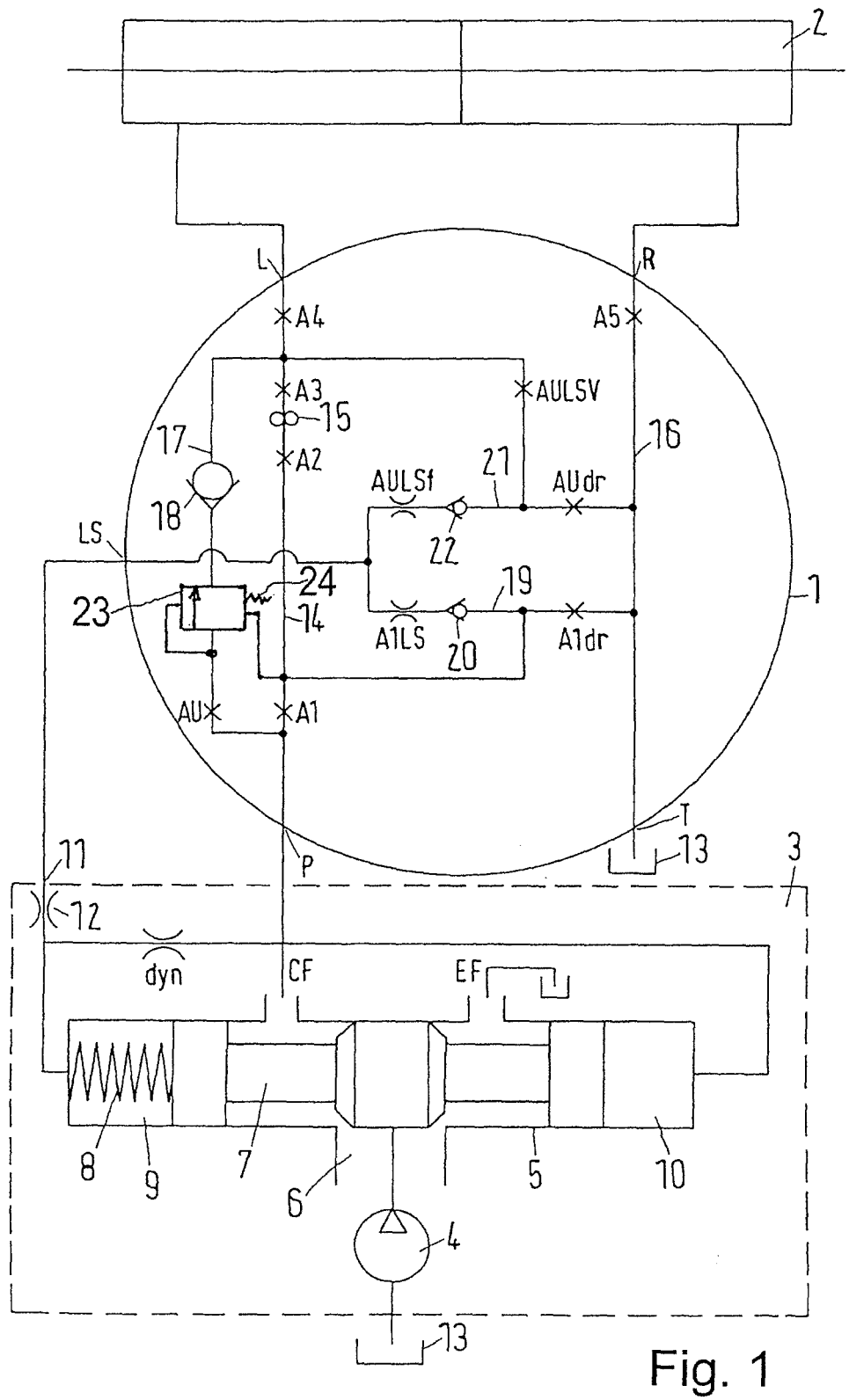
FIG. 1 is a schematic view of a first embodiment of a hydraulic steering device and FIG. 2 is a schematic view of a second embodiment of a hydraulic steering device.

A hydraulic steering control unit 1 comprises a supply port arrangement having a supply port P and a return port T. Furthermore, the steering control unit 1 comprises a working port arrangement having two working ports L, R. The working ports L, R can be connected to a steering motor 2 shown by way of example. Other types of steering motors are possible.

The supply port P is connected with a source 3 of hydraulic fluid under pressure. In the present case this source comprises a fixed displacement pump 4 and a priority valve 5, the input 6 of which being connected to the pump 4. The priority valve 5 has a first output CF connected to the supply port P of the steering control unit 1 and a second output EF connected to a further hydraulic consumer having a lower priority than the steering control unit 1 as it is known in the art.

The priority valve is a dynamic load sensing type as it is known in the art. The priority valve 5 comprises a piston 7 controlling the flow of hydraulic fluid from the input 6 to one of the two outputs CF, EF. The piston 7 is on one side loaded by a spring 8. The spring 8 is arranged in a first pressure chamber 9. This pressure chamber 9 is connected to the first output CF of the priority valve via a bleed dyn.

The opposite side of the piston 7 is loaded by a pressure in a second pressure chamber 10. The second pressure chamber 10 is connected to the first output CF of the priority valve 5. The source 3 has a load sensing input which is connected to the first pressure chamber 9 via a fixed bleed 12.

Such source 3 of dynamic load sensing type is known per se so that no further explanation is necessary. However, the source 3 can be replaced by another source of a dynamic load sensing type, like a load sensing controlled pump.

The supply port P of the steering control unit 1 is connected to the first output CF of the priority valve 5. The return port T is connected to a tank 13. The load sensing port LS is connected to the load sensing port 11 of the source 3. However, a priority valve is not necessary in all cases.

The steering control unit 1 comprises a number of parts which are moveable relative to each other in order to define variable orifices and a flow meter means as will be described later on. In many cases the steering unit 1 comprises a housing, a sleeve and a spool. Usually the spool can be connected to a steering wheel. The spool can be rotated over a limited angle relative to the sleeve, thereby opening some orifices and closing other orifices so that hydraulic fluid can flow through a flow meter means. The flow meter means turns back the sleeve relative to the spool as it is known in the art.

The figure schematically shows a main flow path 14. The main flow path 14 comprises in series connection a variable main flow orifice A1, the first variable flow meter means orifice A2, a flow meter 15, a second variable flow meter means orifice A3 and a variable working port orifice A4. The figure shows a single flow meter 15. However, it is also possible to use more than one flow meter 15. In this case, when the pressure of the supply port is sufficiently high for effecting steering, the flow meters are connected in parallel. When the pressure drops below a predetermined value, all but one flow meters are shut-circuited by a valve and the remaining flow meter only is used as auxiliary pump. The invention relates to both embodiments using the term flow meter means for a single flow meter 15 and for two or more flow meters.

The housing, the spool and the sleeve do not only define the variable orifices A1-A4 but include also direction valve means which are not shown here in order to simplify the explanation. Therefore the main flow path 14 is arranged between the supply port P and one of the working ports L depending on the direction of rotation of the steering wheel.

The main flow path 14 can be established between the supply port P and the other working port R as well.

When the main flow path 14 has been established between the supply port P and the left working port L, a return flow path 16 is established between the other working port R and the return port T. A variable working port orifice A5 is arranged in this return flow path 16.

An amplification flow path 17 is arranged parallel to the main flow path 14. The amplification flow path 17 branches of the main flow path 14 upstream the variable main orifice A1 and is connected to the main flow path 14 downstream the second variable flow meter means orifice A3. A check valve 18 is arranged in the amplification flow path 17 opening in a direction to the working port L.

The load sensing port LS is connected to the main flow path 14 by means of a main load sensing path 19. A first fixed orifice A1LS is arranged in said main load sensing path 19 as well as a check valve 20 opening in a direction to the main flow path 14. Furthermore the main load sensing path 19 is connected to the return port T via first drain orifice means A1dr.

Furthermore the load sensing port LS is connected to the amplification flow path 17 by means of an amplification load sensing path 21. A second fixed orifice AULSf is arranged in this amplification load sensing path 21 as well as a check valve 22 opening in a direction to the amplification flow path 17. The amplification load sensing path 21 is connected to the return port T via second drain orifice means AUdr.

Steering preventing means AULSV are arranged in the amplification load sensing path 21 between the check valve 22 and the amplification flow path 17.

The operation of the steering control unit 1 is as follows:

In a neutral position (steering angle equal 0° including a dead band around 0°) the orifices A1, A2, A3, A4, A5 and AULSV are closed. The first drain orifice A1dr and a second drain orifice AUdr are open to allow hydraulic fluid supplied via the load sensing port LS to be drained to the return port T. Therefore some hydraulic fluid under pressure necessary for actuating the steering motor 2 is permanently available in the steering control unit 1 as it is in an open centre steering control unit. This has the additional advantage that the steering control unit 1 can be permanently held on the temperature of the hydraulic fluid.

When a driver of a vehicle in which the steering control unit 1 is build in operates the steering wheel, the val-ving elements of the steering control unit 1 are moved relative to each other, e.g. the spool and a sleeve are rotated relative to each other. Depending on the angle of rotation the variable orifices behave as follows: The first orifices to open are the variable flow meter means orifices A2, A3. The next orifices to open are the working port orifices A4, A5. The last orifices to open are the variable main orifice A1 and the variable amplification orifice AU. The steering preventing means AULSV which is presently also a variable orifice starts to open between the variable flow meter means orifices A2, A3 and the variable working port orifices A4, A5.

The first drain orifice means A1dr and the second drain orifice means AUdr start closing when the spool and the sleeve are rotated relative to each other. However, they are fully closed only at an angle at which the variable main orifice A1 and the variable amplification orifice AU just have started to open.

When the steering angle is large, the two drain orifice means A1dr, AUdr are closed so that hydraulic fluid can not escape from the load sensing port LS directly to the return port T. Hydraulic fluid is supplied from the supply port P to one of the working ports L through the main flow path 14 and through the amplification flow path 17. The fluid in the main flow path 14 is metered. The metering in the flow meter 15 (or flow meters) provoke that the spool and the sleeve are returned back to their neutral position. When the variable main orifice A1 closes, the variable amplification orifice AU closes as well. Therefore the flow of fluid through the amplification flow path 17 is controlled in the same way as the flow of fluid through the main flow path 14.

The volume flow is determined by the flow resistance of the amplification flow path 17. When this flow resistance is the same as that of the main flow path 14, the same flow is established through the main flow path 14 and through the amplification flow path 17 so that an amplification of 2:1 can be achieved. When the flow resistance of the amplification flow path 17 is only half of the flow resistance of the main flow path 14, the flow of hydraulic fluid through the amplification flow path 17 will be double of that through the main flow path 14 so that an amplification of 3:1 can be achieved.

When the steering angle is small, the variable main orifice A1 and the variable amplification orifice AU are not opened. Nevertheless the steering motor 2 should be actuated. To this end the first drain orifice means A1dr and the second drain orifice means AUdr are throttled. The ratio between the first drain orifice means A1da and the second drain orifice means AUdr is the same as the ratio between the flow resistance between the main flow path 14 and the amplification flow path 17, i.e. when the volume flow through the main flow path 14 is the same as through the amplification flow path 17, the volume flow through the main load sensing path 19 is the same as through the amplification load sensing path 21. When the amplification flow path 17 allows the double of the flow through the main flow path 14 the amplification load sensing path 21 allows the double of the flow through the main load sensing path 19.

The two drain orifice means A1dr, AUdr have the same throttling characteristic, i.e. at each angle of rotation between spool and sleeve the first drain orifice means A1dr allows the same percentage of the flow through the main load sensing path 19 to part as the second drain orifice means AUdr does.

As mentioned above, when the steering angle is only small, the variable main orifice A1 and the variable amplification orifice AU are still closed. However, the two drain orifice means A1dr, AUdr start throttling the flow of hydraulic fluid to the return port T so that the remaining flow of hydraulic fluid enters the main flow path 14 and the amplification flow path 17, respectively, to arrive at the working port L in order to actuate the steering motor 2. Hydraulic fluid coming back from the steering motor 2 enters the steering control unit 1 at the other working port R and returns back to the tank 13 via the tank port T.

There are only two ways for the hydraulic fluid entering the steering control unit 1 at the load sensing port LS: The first way is via the main load sensing path 19 and the first drain orifice means A1dr and the amplification load sensing path 21 and the second drain orifice means AUdr directly to the tank port T. The other way is (when the two drain orifice means A1dr, AUdr are partly or fully closed) through the main flow path 14 or the amplification flow path 17, respectively, to the working port L and back through the working port R. It is advantageous to match the variable working port orifice A5 to the two drain orifice means A1dr, AUdr so that the variable working port orifice A5 can take over the volume flow of hydraulic fluid which is throttled by the two drain orifice means A1dr, AUdr. However, the variable working port orifice A5 is dimensioned so that a certain back pressure can be achieved in the steering motor 2.

Such a steering control unit can be used in a reaction system and as well in a non-reaction system.

However, when in such a hydraulic steering device the flow meter 15 is jammed, e.g. by dirt or by abraded particles of the system, the flow meter 15 cannot close the orifices A1, A2, A3, A4 in the main flow path 14 and the orifice AU in the amplification flow path 17. The flow through the main flow path 14 is blocked by the jammed flow meter 15. All hydraulic fluid under the pressure at the pressure port P can flow to the working port L thereby actuating the steering motor 2 which is unwanted.

To this end a valve 23 is provided in the amplification flow path 17. This valve 23 is actuated in an opening direction by the pressure in the amplification flow path 17 upstream the valve 23. On the other hand, the valve 23 is actuated in closing direction by the pressure in the main flow path upstream the flow meter 15 and in this example downstream the main orifice A1. Furthermore, the valve 23 is actuated in closing direction by spring means 24. The spring means 24 generate a force corresponding to a pressure drop caused by the two flow meter means orifices A2, A3 and the flow meter 15 in an undisturbed way of operation.

In normal operation there is a certain pressure drop at the main orifice A1. Therefore, the pressure acting on the valve 23 in closing direction is not sufficient to close the valve 23.

However, when the flow meter means 15 is jammed or blocked there is no flow through the main flow path 14 and consequently there is no pressure drop at the main orifice A1. In this case almost the full pressure of the pressure port P is available downstream the main orifice A1. This pressure is able to close the valve 23 in a very short time. Since the first main orifice A1da is closed there is no way for the hydraulic fluid in the main flow path 14 to escape. Therefore, the full pressure of the pressure port P comes to the input of the flow meter means 15. This pressure can be up to 200 bars. Such a pressure can operate the flow meter means 15 even in case of jam by dirt. As soon as the flow meter means 15 is operated again, the pressure in the main flow path 14 decreases, the valve 23 opens and the hydraulic steering device 1 can operate in a normal way.

Figure 2:
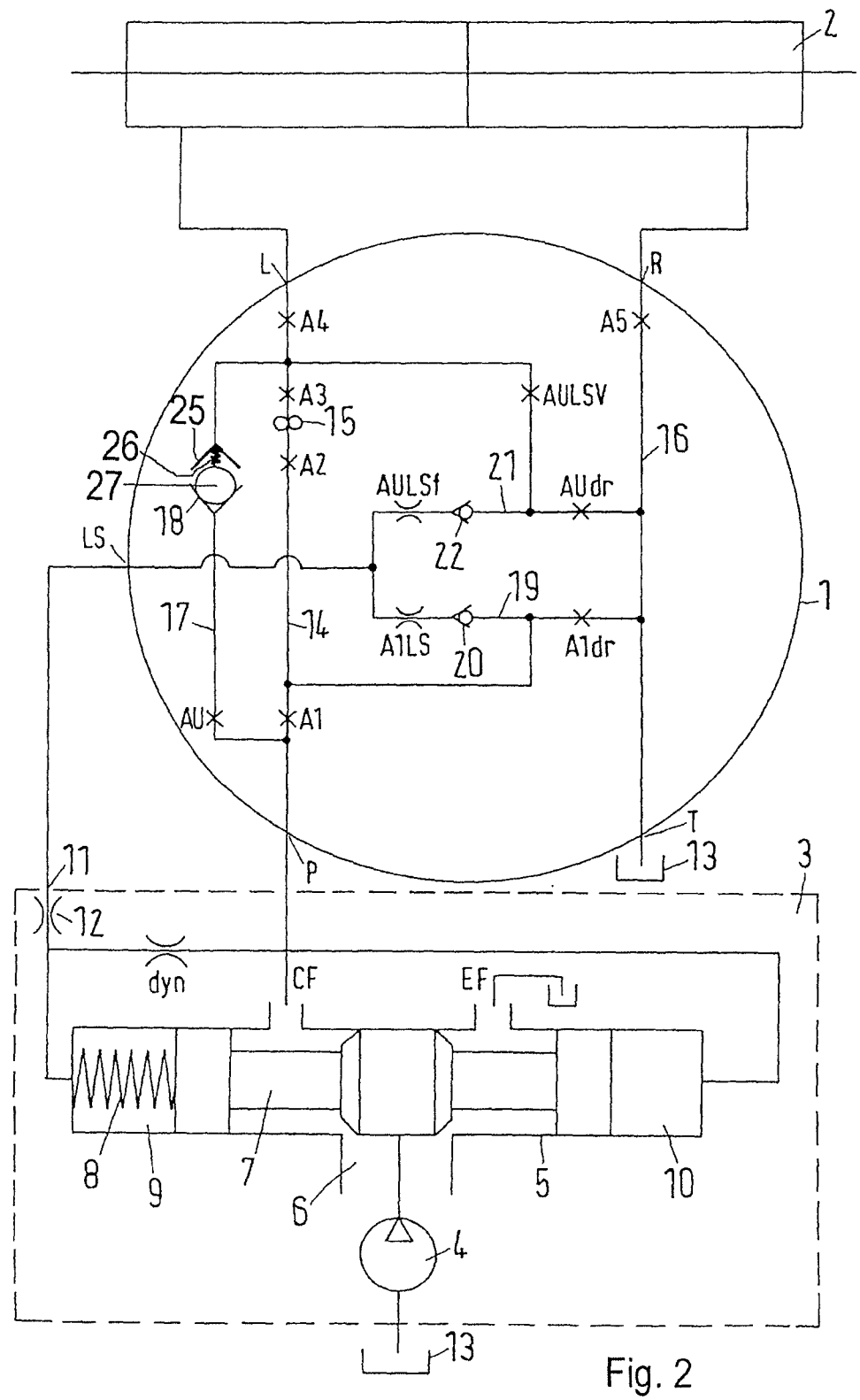

A second possibility to reach this effect is shown in FIG. 2. The same elements are designated with the same numerals as in FIG. 1.

In this case the check-valve 18 is provided with an additional valve seat 25 and opening spring means 26. In a normal operation a valve element 27 of the check valve 18 is lifted to allow passing of hydraulic fluid through the amplification flow path 17. However, the pressure and the flow of the fluid in the amplification flow path 17 is not sufficient to press the valve element 27 against the valve seat 25 since the opening spring means 26 prevent such a closing of the check valve 18.

However, when the flow meter 15 is blocked or jammed and there is no flow through the main flow path 14 the pressure in the amplification flow path 17 increases and pushes the valve element 27 against the force of the opening spring means 26 against the valve seat 25 so that the amplification flow path 17 is interrupted in a direction from the pressure port P to the working port L.

The technical effect is the same as in the example described above. When there is no flow through the amplification flow path 17 the pressure of the pressure port P acts on the flow meter means 15. In many cases this is sufficient to remove the dirt from the flow meter means 15 and to terminate the jamming.

As soon as the pressure between the check valve 18 and the amplification orifice AU drops the opening spring means 26 pushes the valve element 27 away from the valve seat 25 so that there is free flow of the hydraulic fluid through the amplification flow path 17.

Both examples have been described in connection with a dynamic LS-system. However, it is clear the use of an amplification flow path 17 in parallel to a main flow path 14 and the use of a valve 23; 25-27 in the amplification flow path 17 can be used in a static LS-system.

Although various embodiments of the present invention have been described and shown, the invention is not restricted thereto, but may also be embodied in other ways within the scope of the subject-matter defined in the following claims.

What is claimed is:

1. A hydraulic steering device comprising a supply port arrangement having a pressure port (P) and a tank port, a working port arrangement having two working ports (L,R), a main flow path between the pressure port (P) and the working port arrangement, a return flow path between the working port arrangement and the tank port, flow meter means being arranged in said main flow path, an amplification flow path being arranged in parallel to said main flow path, said amplification flow path being connected to said main flow path downstream of said flow meter means in a direction from said pressure port (P) to said working port arrangement, wherein pressure increasing means are provided to increase a pressure over said flow meter means in case a flow through said main flow path is blocked by said flow meter means.

2. The hydraulic steering device according to claim 1, wherein said pressure increasing means comprise a valve, said valve being arranged in said amplification flow path and interrupting a flow through said amplification flow path.

3. The hydraulic steering device according to claim 2, wherein said valve is actuated by a pressure in said main flow path upstream said flow meter means.

4. The hydraulic steering device according to claim 3, wherein said valve is actuated by a pressure downstream a main orifice.

5. The hydraulic steering device according to claim 4, wherein said valve is actuated in closing direction by the pressure upstream said flow meter means and is actuated in opening direction by a pressure upstream said valve.

6. The hydraulic steering device according to claim 5, wherein said spring means generate a force corresponding to a pressure drop over said flow meter means in said main flow path.

7. The hydraulic steering device according to claim 2, wherein said valve is actuated by a flow through said amplification flow path.

8. The hydraulic steering device according to claim 7, wherein said valve is a check valve biased in an opening direction by an opening spring means.

9. The hydraulic steering device according to claim 8, wherein said check valve is a double acting check valve preventing a back flow from said working port arrangement to said pressure port (P).

10. The hydraulic steering device according to claim 5, wherein said spring means generate a force corresponding to a pressure drop over said flow meter means in said main flow path,
wherein at least one flow meter orifice is present in said main flow path.

* * * * *